Nov. 19, 1968    F. W. KERN ET AL    3,411,909

PHOTOGRAPHIC FILM LEADER TREATMENT

Filed June 24, 1964

FREDERICK W. KERN
HUBERT NERWIN
INVENTORS

BY R. Frank Smith
David P. Ogden

ATTORNEYS

United States Patent Office 3,411,909
Patented Nov. 19, 1968

3,411,909
PHOTOGRAPHIC FILM LEADER TREATMENT
Frederick W. Kern and Hubert Nerwin, Rochester, N.Y., assignors to Eastman Kodak Company, Rochester, N.Y., a corporation of New Jersey
Filed June 24, 1964, Ser. No. 377,588
7 Claims. (Cl. 96—78)

ABSTRACT OF THE DISCLOSURE

A film leader having a longitudinal portion of one edge deformed and elongated and a subsequent longitudinally displaced portion of the opposite edge deformed and elongated to provide the leader with a serpentine configuration to prevent edge fog of the underlying film.

---

The present invention relates to a photographic reel arrangement and more particularly to an arrangement for controlling edge fog of roll film which does not have backing paper interleaved therewith.

In the art of photographic film packaging, one of the problems which has been of major importance is avoiding of fogging exposure of the undeveloped film when it is on a reel which may be handled in an illuminated environment, such as during camera loading. One practical solution to this problem has been to provide a backing paper wherein the edges of the paper are feathered so that they tightly engage the flanges of the reel. However, when using relatively long filmstrips on reels, it is not practicable to attempt to supply backing paper because of the convolution growth problems as well as because of the increase in mass with such an amount of backing paper. Various techniques for avoiding fogging damage of a film have been utilized in the past including providing the film with sprocket holes at both edges whereby a certain amount of edge fog is not particularly destructive of the useful portion of the film. Also, by having close tolerance control during production of the reels and the film, minimum amounts of light are able to reach the edges of the film. However, in attempting to utilize a greater portion of the lateral film area, without backing paper protection, as by making smaller sprocket holes in a motion picture filmstrip or by providing sprocket holes on only one edge of the filmstrip, present techniques do not provide as great a margin of safety from edge fogging exposure as might be desired.

Therefore, an object of the present invention is to provide a simple and reliable photographic film arrangement for reducing the probability of edge fog on coiled filmstrips.

In accordance with one embodiment of our invention, the leading and trailing ends of the filmstrip are provided with a serpentine structure that tends to shift adjacent convolutions of the film laterally, thus tending to close any clearance gap that might exist between the coiled filmstrip and the flanges of the support spool.

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawing, in which:

Figure 2:
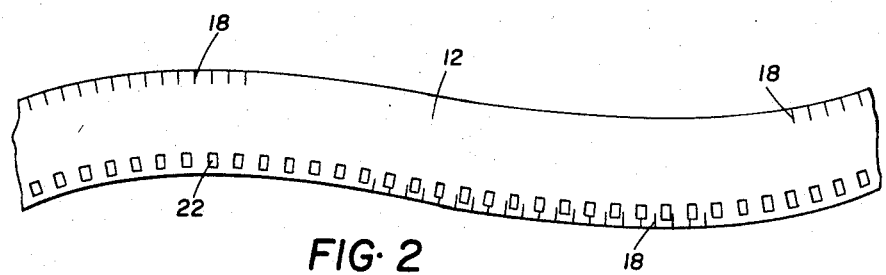
FIG. 2 is a top plan view of a portion of a leader section of the filmstrip.
Figure 1:
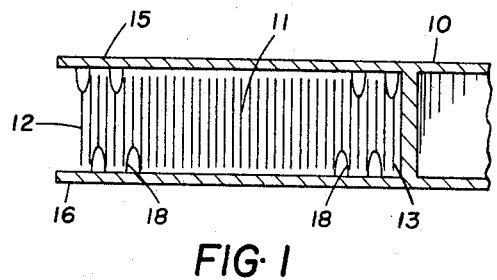
FIG. 1 is a cross section view of a reel wound with a filmstrip incorporating our invention.

Referring now to the drawing wherein like numbers refer to similar parts, we have shown in FIG. 1 a film supply reel 10 having wound thereon a filmstrip 11 with the central section of the length of the filmstrip 11 being substantially flat laterally and straight as is normal to such filmstrips. By way of example, the filmstrip may be of the type used in motion picture cameras of 8 mm. or 16 mm. size. A leading or leader portion 12 of the filmstrip 11 and a trailing portion 13 are not straight, being fluted or otherwise worked at the edges so that the filmstrip tends to assume a serpentine shape as indicated in FIG. 2. Thus, some of the layers of the leader portion 12 engage an upper flange 15 of the reel 10 and others engage a lower flange 16. Such tight engagement assures a good light seal, being of greatest value in such cases as the clearances provided are more than absolutely necessary.

Figure 3:
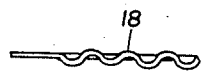
FIG. 3 illustrates a view of the edge of the filmstrip shown in FIG. 2.

The leader 12 of the filmstrip, as indicated in FIG. 2 assumes a serpentine shape because of working of alternate longitudinal portions of the edges of the film which tend to stretch that edge portion. Because it is most economical to have the central section of the filmstrip 11 remain straight, it is most practicable and economical to accomplish the serpentine shaping of the ends of each filmstrip 11 by working the edges during the winding of the filmstrip on the reel 10 when initially packaging the film in marketable form. As indicated in FIGS. 2 and 3, one manner of working the filmstrip edge is with a laterally oriented fluting 18, which fluting operation accomplishes a compression of the film and therefore an elongation. Such fluting 18 is continuous in several areas at the leader and trailing portions of the filmstrip 11 shown in cross section in FIG. 1.

Although the working of longitudinally spaced edges of a filmstrip was expected to develop a serpentine form, the particular result was surprising. It might be expected that fluting or corregation as shown at 18 would shorten the film and require a greater film length, in which case the serpentine shape would be the reverse of that illustrated in FIG. 2. Such a phenomenon is exemplified by a usual method of fitting lengths of stove pipe and the like. However, use of sufficient pressure to permanently set such fluting in photographic film compresses the film sufficiently to effectively elongate that edge of the filmstrip.

In using the fluting illustrated in FIG. 3, care must be taken to avoid making the edge fluting such that two overlapping layers have mating fluting. We prefer that such fluting be for a distance less than a complete layer in the leader 12, and that 2–5 inches of fluting be followed by 2–5 inches of unfluted space before commencing the fluting of the opposite side for the usual 8 mm. film. This is because of the probability that any over-lapping mating engagement of fluting of one edge would result in substantial spaces between the film layers which might provide a substantial, although tortuous, light leak path back and forth across layers of film to the central portion of the filmstrip 11 (FIG. 1).

Figure 4:
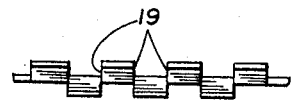
FIG. 4 shows another filmstrip edge view illustrating another embodiment of our invention.

Once the value of a serpentine configuration is appreciated, and the working of alternate edges is recognized as an advantageous method of accomplishing it, other modifications of our invention are envisionable. One other arrangement for elongating alternate edges of the filmstrip is indicated in FIG. 4 wherein lateral slits 19 cause the filmstrip 11 to stretch slightly because of the working during the slitting operation. When slitting, application of heat will reduce sharp corner problems.

Figure 5:
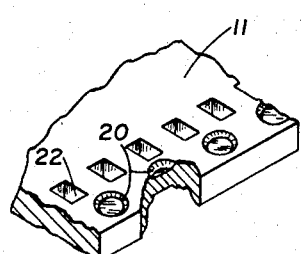
FIG. 5 is an enlarged perspective view partially in section of another embodiment of our invention.

Another arrangement for elongating the filmstrip edge is illustrated in FIG. 5 wherein a series of closely spaced, (intermittent), depressions 20 are made in one or both surfaces and along alternate edges so that these edge portions are elongated to form a serpentine shape. This arrangement need not be carefully spaced to avoid a tortuous path light leak passing between the film layers as it does not cause any corresponding increased thickness of the film to provide gaps which would permit passage of light between layers of film.

As should now be apparent, the alternate working of edges of the leader portion 12 will develop a serpentine configuration without causing a serpentine configuration of the central section of the filmstrip 11. The layers of the leader portion 12 are coiled closer to one or the other of the flanges 15 and 16 of the reel 10 because of this shape. The filmstrip illustrated in FIG. 2 is provided with sprocket holes 22 at only one edge as would be used in an 8 mm. filmstrip. It is, of course, intended that such sprocket holes may be provided at both sides of the filmstrip as in a 16 mm. filmstrip and the like.

While we have shown and described particular embodiments of the present invention, other modifications may occur to those skilled in this art. For instance, we contemplate that certain solvents and supersonic treatments would provide similar working of the edges to provide serpentine leading and trailing portions of the film during winding of the film in final marketable form. We intend, therefore, to have the appended claims cover all modifications which fall within the true spirit and scope of our invention.

We claim:
1. A film leader, arranged to be wound on a reel, having a longitudinal portion of one edge compressed and elongated, and a subsequent longitudinally displaced portion of the opposite edge compressed and elongated to provide said leader with a serpentine configuration.

2. The invention according to claim 1 wherein the respective portions of compression and elongation are of a length less than the minimum periphery of said leader on said reel.

3. The method of forming a light-tight edge seal of a film leader on a film reel to prevent fogging of the edge of a light-sensitive film underlying the film leader comprising the steps of working a portion of a first edge of said leader to thereby elongate that edge, and subsequently working a portion of an opposite edge of said leader longitudinally spaced from said first edge to thereby elongate that portion, whereby the worked edges of said film provide the leader with a serpentine configuration.

4. The invention according to claim 3 wherein the respective portions of elongation are of a length less than the minimum periphery of said leader on said reel.

5. The invention according to claim 3 wherein the working of the respective edges includes compressing said edges.

6. The invention according to claim 3 wherein the working of said edges includes slitting said edges.

7. A film leader, arranged to be wound on a reel, having a longitudinal portion of one edge provided with a plurality of transverse slits thereby elongating said edge, and a subsequent longitudinally displaced portion of the opposite edge provided with a plurality of transverse slits to elongate that portion, thereby providing said leader with a serpentine configuration.

References Cited

UNITED STATES PATENTS

| | | | |
|---|---|---|---|
| 1,454,813 | 5/1923 | Jones | 96—78 |
| 1,454,817 | 5/1923 | Jones | 96—78 |
| 1,900,879 | 3/1933 | Jones | 96—78 |
| 1,690,739 | 11/1928 | Lowkrantz | 96—78 |
| 2,105,238 | 1/1938 | Wittel | 96—78 |
| 2,391,269 | 12/1945 | Philips | 96—78 |

NORMAN G. TORCHIN, *Primary Examiner.*

R. MARTIN, *Assistant Examiner.*